(12) United States Patent
Rollin et al.

(10) Patent No.: US 9,285,600 B2
(45) Date of Patent: Mar. 15, 2016

(54) OPTICAL SYSTEM WITH SLAVED PUPIL ENCODING

(75) Inventors: Joël Rollin, L'Etrat (FR); Frédéric Diaz, Vaureal (FR)

(73) Assignee: Thales, Courbevoie (FR)

( * ) Notice: Subject to any disclaimer, the term of this patent is extended or adjusted under 35 U.S.C. 154(b) by 15 days.

(21) Appl. No.: 14/232,194

(22) PCT Filed: Jul. 4, 2012

(86) PCT No.: PCT/EP2012/063049
§ 371 (c)(1),
(2), (4) Date: Feb. 21, 2014

(87) PCT Pub. No.: WO2013/007576
PCT Pub. Date: Jan. 17, 2013

(65) Prior Publication Data
US 2014/0293097 A1    Oct. 2, 2014

(30) Foreign Application Priority Data
Jul. 13, 2011    (FR) ...................................... 11 02210

(51) Int. Cl.
*H04N 5/225*    (2006.01)
*G02B 27/46*    (2006.01)
(Continued)

(52) U.S. Cl.
CPC ............ *G02B 27/46* (2013.01); *G02B 27/0075* (2013.01); *H04N 3/1562* (2013.01);
(Continued)

(58) Field of Classification Search
CPC . H04N 5/2254; H04N 5/2226; H04N 3/1562; H04N 5/23296; G02B 27/0075; G02B 2207/129

USPC .............. 348/208.11, 240.1, 240.3, 259, 290, 348/335, 340, 344
See application file for complete search history.

(56) References Cited

U.S. PATENT DOCUMENTS

| 6,069,738 A | 5/2000 | Cathey, Jr. et al. |
| 2004/0228005 A1 | 11/2004 | Dowski, Jr. |

(Continued)

FOREIGN PATENT DOCUMENTS

| FR | 2923028 A1 | 5/2009 |
| WO | 2004090581 A2 | 10/2004 |

(Continued)

OTHER PUBLICATIONS

Frederic Diaz, et al., "Design of a Complex Filter for Depth of Focus Extension", Optics Letters, Apr. 15, 2009, pp. 1171-1173, vol. 34, No. 8.

(Continued)

*Primary Examiner* — Hung Lam
(74) *Attorney, Agent, or Firm* — Baker & Hostetler LLP

(57) ABSTRACT

In the field of optical systems comprising at least one optical objective, a photosensitive detector and an image processing unit, the optical objective comprising a pupil encoding filter, the image processing unit performing digital filtering of the images output by the photosensitive detector, a system has a processing unit comprising means arranged in such a way as to process at least one preset, the characteristics of the digital filtering applied to the image depending on this preset. The preset may come from external sensors of temperature and/or pressure or be one of the parameters of the optical objective such as the focal length value, the aperture of the iris, or the desired focal distance. The preset can also be different for different zones of the image, to better take into account the variations of the aberrations in the field of the focusing objective.

15 Claims, 2 Drawing Sheets

(51) Int. Cl.
  *H04N 5/232* (2006.01)
  *H04N 3/14* (2006.01)
  *H04N 5/222* (2006.01)
  *G02B 27/00* (2006.01)

(52) U.S. Cl.
  CPC .......... *H04N5/2226* (2013.01); *H04N 5/2254* (2013.01); *H04N 5/23296* (2013.01); *G02B 2207/125* (2013.01)

(56) References Cited

U.S. PATENT DOCUMENTS

| | | | |
|---|---|---|---|
| 2006/0038893 A1* | 2/2006 | Knoedgen et al. | 348/222.1 |
| 2007/0247725 A1 | 10/2007 | Dowski, Jr. et al. | |
| 2008/0174678 A1* | 7/2008 | Solomon | 348/231.99 |
| 2010/0074520 A1* | 3/2010 | Kinoshita | 382/167 |
| 2011/0242372 A1* | 10/2011 | Kosaka | 348/242 |
| 2012/0257278 A1* | 10/2012 | Simonov et al. | 359/557 |
| 2012/0307133 A1* | 12/2012 | Gao et al. | 348/349 |

FOREIGN PATENT DOCUMENTS

| | | |
|---|---|---|
| WO | 2006001785 A1 | 1/2006 |
| WO | 2007118097 A1 | 10/2007 |
| WO | 2008008084 A2 | 1/2008 |
| WO | 2009053422 A1 | 4/2009 |

OTHER PUBLICATIONS

Frederic Diaz, et al., "Increase in Depth of Field Taking into Account Deconvolution by Optimization of Pupil Mask", Optics Letters, Oct. 1, 2009, pp. 2970-2972, vol. 34, No. 19.

Frederic Diaz, et al., "Comparison Between a New Holographically Generated Complex Filter and the Binary Phase Filter for Depth of Field Extension", Proc. of SPIE, 2009, pp. 73290B-1-73290B-8, vol. 7329.

Frederic Diaz, et al., "Optimization of Hybrid Imaging Systems Including Digital Deconvolution in the Presence of Noise", OSA Technical Digest, Paper IMD4, 2010, 3 pages.

\* cited by examiner

OPTICAL SYSTEM WITH SLAVED PUPIL ENCODING

CROSS-REFERENCE TO RELATED APPLICATIONS

This application is a National Stage of International patent application PCT/EP2012/063049, filed on Jul. 4, 2012, which claims priority to foreign French patent application No. FR 1102210, filed on Jul. 13, 2011, the disclosures of which are incorporated by reference in their entirety.

FIELD OF THE INVENTION

The field of the invention is that of optical systems comprising means for processing images using pupil encoding. These systems comprise an optical objective, a phase and/or amplitude filter, a photosensitive detector and an image processing unit capable of processing in real time or in deferred time.

BACKGROUND

The subject of the invention is the use of image processing to relax the opto-mechanical constraints or to simplify the combination of the objective or to increase the performance of the whole system or else to preserve the performance of the objective in difficult environments notably involving considerable changes in temperature. One of the aims of the invention is also to increase the depth of field in such a way as to improve 3D perception in the context, for example, of binocular driving applications with thermal vision.

The simplification lies, for example, in the removal of a focusing mechanism translating a group of lenses along the optical axis in order to compensate for pressure or temperature variations while keeping an image on the detector sharp. In conventional solutions, this mechanism is also used to switch from infinity sight to finite distance sight.

The invention uses a known principle: pupil encoding, which consists in inserting into an optical combination an optical filter which is generally a phase and/or amplitude plate, at the level of the pupil of the objective, making it possible to increase the depth of field. Image processing is used to carry out a deconvolution of the image by the signature of the objective with this plate making it possible to preserve a quality of the image in a given range of depths of field.

FIG. 1 represents an optical system comprising a focusing optic comprising one such filter. This optic comprises three lenses L1, L2 and L3, two traditional optical filters F1 and F2 performing for example the desired spectral transmission and the pupil encoding filter $\phi$. As seen in FIG. 1, the filter is arranged in the vicinity of the pupil P, convergence point of the field rays in FIG. 1. It could also be arranged on the back surface of the lens L2 so as to decrease the optical interfaces.

The operating principle of the filter uses deconvolution via the impulse response of the optic or PSF, acronym of Point Spread Function. p is the response of the system to an infinitely small object. If we know the impulse response p of an optic, knowing an object f, the image f' of f given by the optic has a value of:

$$f' = f \otimes p$$

$\otimes$ being the symbol of the convolution,

In Fourier space, space of spatial frequencies, we have:
F'=F·P with F', F and P Fourier transforms of f', f and p
P is the modulation transfer function.

To perfectly restore the object f, it would therefore be necessary, in this space, to invert F=F'/P. Unfortunately this operation is not always possible. It is even impossible when P goes through the origin and is numerically unstable when P is too low. When the optic is defocalized, the function P exhibits several zeros. It is therefore necessary to stabilize it to increase depth of field. Special phase filters are adapted for this task. Thus, this technique requires on the one hand a phase filter adapted to the function that one wishes to optimize, and on the other hand image processing that will make it possible to perform the deconvolution operation.

This technique has been the subject of various publications. The essential points tackled are the physical principles allowing the correction of geometric or dynamic aberrations or the correction of focusing defects and the technical principles for producing phase or amplitude correction filters. The targeted applications relate to the infrared field, microlithography and more generally the field of imaging.

The patents of the company CDM OPTICS filed by Edward Dowski relating to the physical principles are of particular relevance, and particularly patent applications WO/2004/090581, WO/2006/001785, and U.S. Pat. No. 6,069,738.

Others include the four articles by F. Diaz, F. Goudail, B. Loiseaux and J. P. Huignard respectively titled "Design of a complex filter for depth of focus extension", Optics Letters 34, 1171-1173 (2009)—"Increase in depth of field taking into account deconvolution by optimization of pupil mask", Optics Letters 34, 2970-2972 (2009)—"Comparison between a new holographically generated complex filter and the binary phase filter for depth of field extension", SPIE, vol. 7329 (2009)—"Optimization of hybrid imaging systems including digital deconvolution in the presence of noise" in Imaging Systems, OSA technical Digest, paper IMD4 (2010).

In his thesis defended May 6, 2011 and titled "Système d'imagerie hybride par codage de pupille", Frédéric Diaz describes a deconvolution algorithm using a Wiener filter. The relationship giving the distribution of light in the image I(x, y) involves the optic O(x, y), the PSF of the optic h(x, y), and the noise b(x, y). It is written, to the nearest magnification of the optic:

$$I(x,y) = h(x,y) * O(x,y) + b(x,y)$$

In the absence of noise, the deconvolution filter is the inverse filter. In the spatial frequency space, we have:

$$TF(d(\sigma_X, \sigma_Y)) = TF(h^{-1}(\sigma_X, \sigma_Y))$$

In practice, the noise must be taken into account and the Wiener filter is used, giving:

$$TF(d) = \frac{TF(h)^*}{|TF(h)|^2 + \frac{S_B}{S_O}}$$

*: transposed by a complex variable
And the estimate of the object has a value of:

$$\hat{O}(x,y) = d(x,y) * I(x,y),$$

d(x, y) being the digital processing applied to the image.
$S_B$ and $S_O$ are the spectral densities of the noise and of the object. This filter approaches the inverse filter when the noise is low and tends towards 0 when the signal is low. For optical systems whose aberrations vary in the field, it is possible to envisage multi-zone algorithms.

If we set a range of defocalization ψ in which we wish to correct the system by pupil encoding and image processing, the estimate of the object finally has a value of:

$$\hat{O}_\psi(x,y) = d_\psi(x,y) * I(x,y)$$

or else $$\hat{O}_\psi(x,y) = d_\psi(x,y) * h_\psi(x,y) * O(x,y) + d_\psi(x,y) * b(x,y)$$

Where $d_\psi(x, y)$ and $h_\psi(x, y)$ are respectively the digital processing assigned to the image and the impulse response of the optical system for the defocalization ψ. We then define a criterion $EQM_\psi$ for the optimization by considering the root mean square deviation between the two quantities $\hat{O}_\psi$ and $O$. It has been demonstrated that the latter can be written:

$$EQM_\psi = \iint |TF[d_\psi(\sigma_X,\sigma_Y)] \cdot TF[h_\psi(\sigma_X,\sigma_Y)] - 1|^2 \cdot S_0(\sigma_X,\sigma_Y) \cdot d\sigma_X \cdot d\sigma_Y + \iint |TF[d_\psi(\sigma_X,\sigma_Y)]|^2 \cdot S_B(\sigma_X,\sigma_Y) \cdot d\sigma_X, \sigma_Y$$

Of course, for a second range of defocalization ψ', we obtain:

$$EQM_{\psi'} = \iint |TF[d_\psi(\sigma_X,\sigma_Y)] \cdot TF[h_{\psi'}(\sigma_X,\sigma_Y)] - 1|^2 \cdot S_0(\sigma_X,\sigma_Y) \cdot d\sigma_X, \sigma_Y + \iint |TF[d_\psi(\sigma_X,\sigma_Y)]|^2 \cdot S_B(\sigma_X,\sigma_Y) \cdot d\sigma_X, \sigma_Y$$

The first term of the criterion $EQM_\psi$ corresponds to the inequality between the PSF and the chosen filter, the second term is associated with the noise of the digital deconvolution. Thus, if the filter is optimized for the first defocalization ψ, then we have:

$$\iint |TF[d_\psi(\sigma_X,\sigma_Y)] \cdot TF[h_\psi(\sigma_X,\sigma_Y)] - 1|^2 = 0$$

and the difference between $EQM_\psi$ and $EQM_{\psi'}$ has a value of:

$$\iint |TF[d_\psi(\sigma_X,\sigma_Y)] \cdot [TF[h_{\psi'}(\sigma_X,\sigma_Y)] - TF[h_\psi(\sigma_X,\sigma_Y)]]|^2 \cdot S_0(\sigma_X,\sigma_Y) \cdot d\sigma_X d\sigma_Y$$

Thus, the variation of the merit function is linked to the variations of the FTM of the optical system, including the phase filter, as a function of the defocalization. The quality of the optical chain for other defocalizations is therefore deduced from deviations in behavior since, if one does not know the defocalization a priori, the digital correction function $d_\psi$ is set to a given value. For other values of defocalization, the filter is less well-adjusted.

Several types of filter are possible, the simplest being composed of a single phase shift, close to a phase difference having a value of π between two zones forming one of the surfaces of the filter. The ratio between the two surfaces is optimized for obtaining the best compromise between the signal-to-noise ratio noted S/B and the correction of the defocalizations for obtaining optimal geometric resolutions.

Other, more complex filters can be implemented and the geometries of the masks described in the literature of the prior art remain applicable to the correction of the defocalizations:

So-called cubic masks whose phase function φ(x, y) in an orthonormal coordinate frame (x, y) has a value of:

$$\phi(x,y) = \alpha \cdot (x^3 + y^3);$$

The so-called CPP (Constant Profile Path) masks;
Masks whose phase function is a trigonometric function;
Simplified annular masks composed of concentric rings, each ring introducing a phase that is constant and different according to the ring. An example of such a filter containing only three rings is shown in FIG. 2. In this configuration, the central ring A1 has the same phase as the peripheral ring A3;
So-called polynomial masks, the filter being referenced in a coordinate frame (x, y), the variation of the phase of the phase filter is a polynomial in x and y. When the mask has radial symmetry, the variation of the phase of the phase filter is a polynomial in r, r representing the distance to the center of the filter;
Asymmetrical masks;
So-called semi-circular masks whose phase variation φ(x, y) of the phase filter verifies, the filter being referenced in a coordinate frame (x, y) in Cartesian coordinates or (r, θ) in polar notation:

$$\phi(x,y,r) = \alpha \cdot \text{sign}(x) \cdot r^\beta \text{ or } \phi(x,y,r) = \alpha \cdot \text{sign}(n \cdot \theta) \cdot r^\beta$$

for so-called semi-circular masks, α and β being constants and the function sign(x) having a value of 1 when x is positive and −1 when x is negative.

The correction filter can also comprise an amplitude function, i.e. it comprises zones with variable optical transmission, beyond the phase function.

Dynamic filters also exist, i.e. filters whose phase or amplitude profile is electrically adjustable according to a chosen configuration. An example of one such filter is given in FIG. 3 which represents two partial cutaway views of a dynamic phase filter. On the left view, the filter is not addressed; therefore its phase is constant. On the right view, the filter is addressed.

This filter essentially comprises two layers, a first layer of BSO (Bismuth Silicon Oxide) and a second layer CL of smectic liquid crystals. These two layers are arranged between two layers of conductive transparent ITO (Indium Tin Oxide) one of which is connected to the electrical ground and the other to a constant voltage $V_0$. The filter comprises a matrix of conductive electrodes with programmable voltages V. As can be seen on the right view in FIG. 3, by addressing the electrodes with different voltages V−, 0 and V+, the crystal molecules take different orientations, provoking various variations in optical index and therefore phase variations on the beams of light that cross the dynamic filter.

Certain versions of this liquid crystal filter can be addressed optically via an optically sensitive layer of BSO, using an auxiliary modulated light source.

As we have seen, whatever the type of correction introduced to the phase filter and whatever the image processing applied, it is necessarily limited to a given range of correction. In other words, if one wishes to use an optic over a large range of defocalizations, whether they are connected to variations in environment such as temperature or pressure or to the finite distance range of sight, the correction introduced by a phase filter can prove inadequate.

SUMMARY OF THE INVENTION

The optical system according to the invention palliates these drawbacks. It is controlled by an external preset making it possible to adapt either the image processing, or the phase filter, or both as a function of a determined parameter. One of the characterizing features of the invention consists in adapting the function $d_\psi(\sigma_X, \sigma_Y)$ to obtain the optimal filter, as a function of information such as temperature, pressure or the finite distance focalization preset.

More precisely, the subject of the invention is an optical system comprising at least one optical objective, a photosensitive detector and an image processing unit, the optical objective comprising a pupil encoding filter, the image processing unit having the function of performing digital filtering of the images output by the photosensitive detector, characterized in that the processing unit comprises means arranged in such a way as to process at least one preset, the characteristics of the digital filtering applied to the image depending on this said preset.

Advantageously, the pupil encoding filter is dynamic. i.e. its phase or amplitude profile is adjustable by means of electrical controls, said phase or amplitude profile being controlled by the preset.

Advantageously, the image being composed of a plurality of adjacent zones, the characteristics of the digital filtering applied to the image are a function of the zone of the image.

Advantageously, the preset is a value of the temperature or the pressure or else the focal distance or an optical parameter of the objective. If the objective is a zoom lens, said parameter is the value of the focal length of the zoom or the value of the aperture of the iris of the zoom.

The MTF, modulation transfer function and filter of spatial frequencies, depends on these various factors.

Advantageously, the pupil encoding filter comprises a phase correction and/or an amplitude correction, i.e. it comprises zones with variable optical transmission, the correction distribution being called mask.

Advantageously, the phase mask has:
  binary distribution, i.e. it comprises at least two phase zones, each zone having a constant phase different from that of the other zones;
  annular distribution, i.e. the value of the phase depends only on its distance to the center of the filter.

Advantageously the phase variation is composed of constant plateaux or is a rational power, a function of the distance to the center of the filter, or is logarithmic, a function of the distance to the center of the filter, or is exponential, depending on the distance to the center of the filter.

Advantageously, the mask has:
  polynomial distribution, i.e. the filter being referenced in a coordinate frame (x, y), the phase variation of the correction filter is a polynomial in x and y;
  cubic distribution, i.e. the filter being referenced in a coordinate frame (x, y), the phase correction varies with $\exp[i\alpha(x^3+y^3)]$, i being the square root of −1, $\alpha$ being a constant.

Advantageously, the phase mask is semi-circular.

Advantageously, the image processing unit operates in real time.

The invention also relates to the calibration process of the previous optical system. Said method comprises at least one step of determining the characteristics of the pupil encoding filter or of the digital filtering associated with a predetermined preset, said characteristics being determined by numerical simulation means and/or by optical test benches.

BRIEF DESCRIPTION OF THE DRAWINGS

The invention will be better understood and other advantages will appear on reading the following non-limiting description, using the appended figures among which.

Finally.

DETAILED DESCRIPTION

Figure 1:
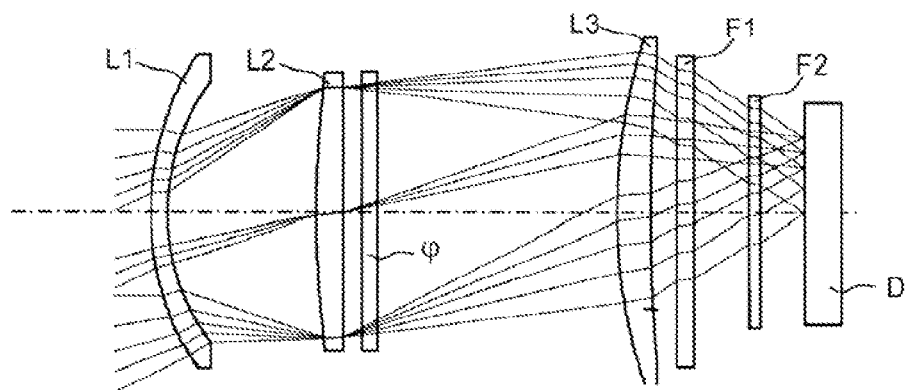
FIG. 1, already commented on, represents an optical objective comprising a phase filter.
Figure 2:
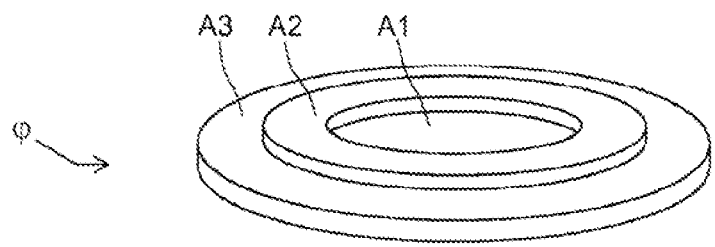
FIG. 2, also commented on, represents an annular phase filter.
Figure 3:
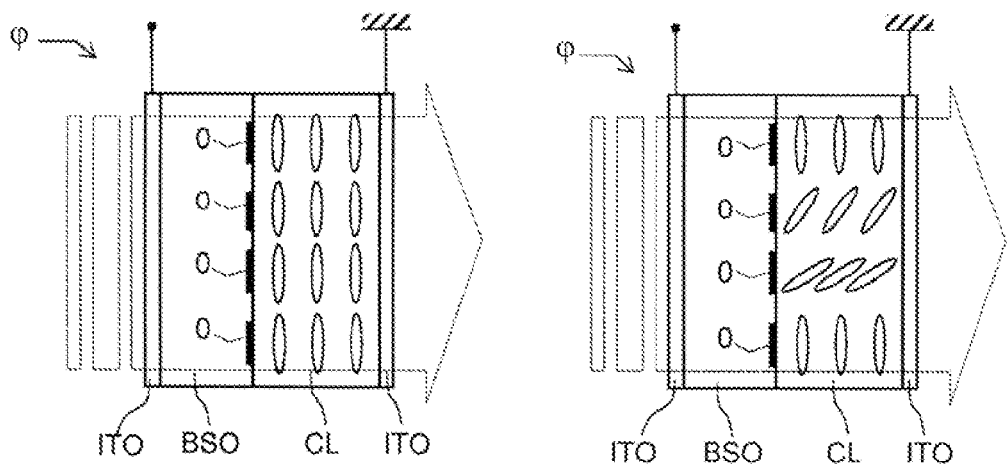
FIG. 3, also commented on, represents a dynamic phase filter.
Figure 4:
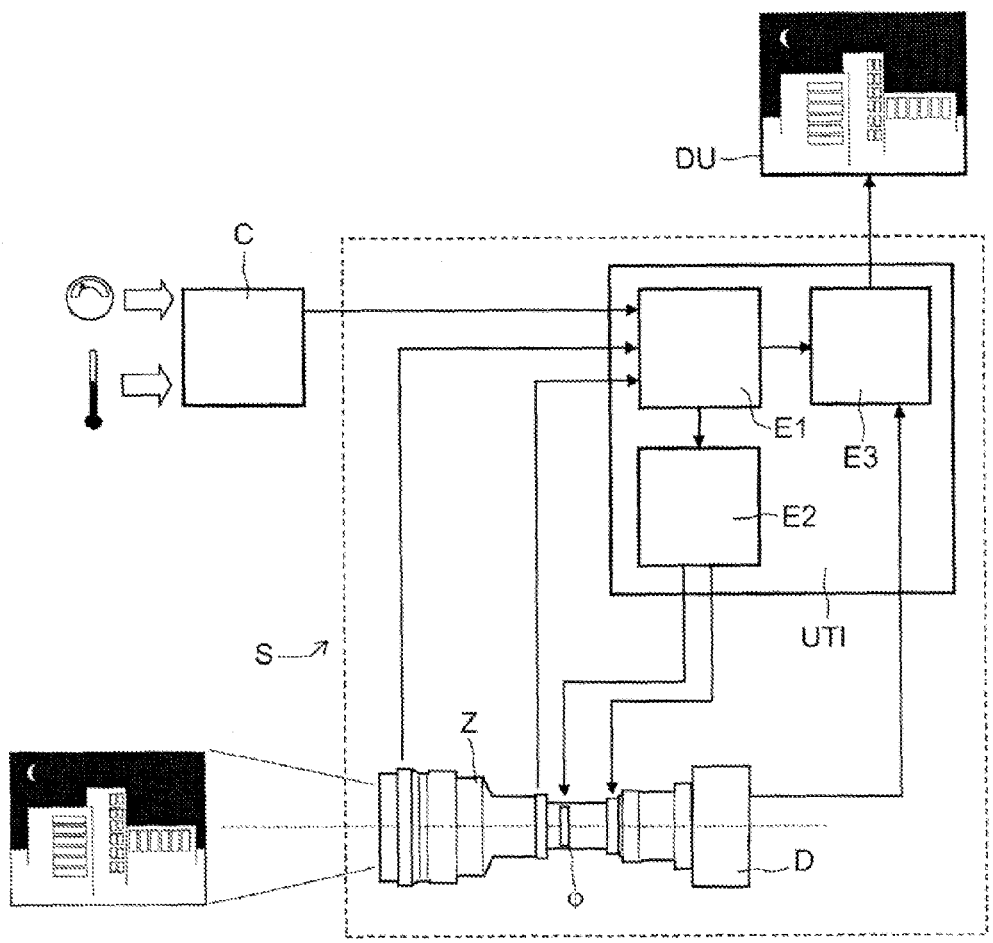
FIG. 4 represents the block diagram of an optical system according to the invention.

By way of nonlimiting example, FIG. 4 represents a block diagram of an optical system S according to the invention. It corresponds to the zone of the figure delimited by a dotted line. It comprises:

an optical objective Z;
a photosensitive detector D and
an image processing unit UTI.

The optical objective Z comprises a pupil encoding filter $\phi$. Generally, this optical objective Z is a zoom. Of course, the system according to the invention can apply to other types of optic. The objective comprises a certain number of mechanical adjustment devices that can be controlled by external controls. These devices consist essentially in linearly moving lenses or groups of lenses inside the objective. These techniques are well known to those skilled in the art. These are essentially focal length, aperture and focusing controls.

As we have seen, the pupil encoding filter can be of phase or amplitude. The correction distribution or phase mask can have:
  binary distribution, i.e. it comprises at least two phase zones, each zone having a constant phase different from those of the other zones;
  annular distribution, i.e. the value of the phase only depends on its distance to the center of the filter.

The phase variation may be composed of constant plateaux or be a rational power, depending on the distance to the center of the filter, or is logarithmic, depending on the distance to the center of the filter, or is exponential, depending on the distance to the center of the filter.

These distributions prevail for objectives with revolutionary symmetry, but, of course, more complicated shapes not exhibiting this symmetry can be envisioned for off-axis systems.

The phase mask can also have:
  polynomial distribution, i.e. the filter being referenced in a coordinate frame (x, y), the phase variation of the correction filter is a polynomial in x and y;
  cubic distribution, i.e. the filter being referenced in a coordinate frame (x, y), the phase correction varies with $\exp[i\alpha(x^3+y^3)]$, i being the square root of −1, $\alpha$ being a constant.

Finally, the phase mask can be semi-circular.

The pupil encoding filter $\phi$ can also be a programmable liquid crystal dynamic filter.

The photosensitive detector D is generally composed of an array of photodetectors, of CCD (Charge-Coupled Device) type, for example. The photosensitive detector-optical objective assembly constitutes a camera. The latter can operate in the visible spectrum or in ultraviolet or in infrared.

The image processing unit UTI comprises three sub-assemblies E1, E2 and E3:

A first sub-assembly E1 processes the presets output by the external sources C. These sources can be sensors measuring a particular parameter of the camera environment such as temperature (symbolized by a thermometer in FIG. 4) or pressure (symbolized by a manometer in FIG. 4) or the user himself, who can send, for example, a preset of focal length, aperture, or focal distance. This first sub-assembly E1 essentially comprises a table of the laws relating the input presets to the various pupil encoding filters and/or to the processes to be applied to the image. These law tables are predetermined by calculation or by a calibration measurement in the factory. At a given preset, there therefore corresponds a filter and/or an image process to apply to the optical system. In the hypothesis where the aberrations and therefore the signature of the optic vary too much in the field, each image processing can be broken down into several units optimized by field zone;

A second sub-assembly E2 controls the various adjustment devices of the objective and the pupil encoding filter, if it is programmable, based on the preceding items of information;

A third sub-assembly E3 performs the digital filtering of images output by the photosensitive detector as a function of the selected image process and sends it towards a display device VDU.

Thus, the landscape taken by the camera gives the best possible image, given the performance of the objective and of the environmental conditions for a given configuration, the opto-mechanical adjustments, the filtering and the process being optimized for this configuration.

More precisely, and by way of nonlimiting example, the operation of the system over a very wide range of temperatures, for example greater than 100 degrees between the coldest use temperature and the hottest use temperature is carried out in the following manner.

A temperature scale being defined, it is known how to calculate and/or measure the thermal defocalizations induced by changes in temperature as well as the maximum excursion range. The defocalization is due to the changes in refractive index of the optical materials, to the changes in the radius of curvature and of thickness of the various diopters due to dilation as well as to expansions of the mechanical shims separating the various optical components.

From the design of the optical combination, it is possible to simulate the defocalization $\psi(\Delta T)$ from a reference temperature $T_0$ by optical calculation. This calculation does not present any problems to those skilled in the art and most optical design software packages allow it. It is also possible on a real optic placed in a thermal chamber to measure the defocalizations as a function of the chamber temperature.

The operational range of temperatures is then divided into various increments based on the reference value $T_0$, each increment is noted $\Delta T_i$, i varying from 1 to N. A constant defocalization $\psi(\Delta T_i)$ is associated with each increment.

The defocalizations $\psi(\Delta T_i)$ being known, one must then determine the best profile of the pupil encoding filter and the digital process associated with the image $d_{\psi(\Delta T_i)}(x, y)$. If the pupil encoding filter is not dynamic, of course, a single profile is calculated corresponding to an average use temperature. The digital process is regulated by the equation:

$$\iint |TF[d_{\psi(\Delta T_i)}(\sigma_X, \sigma_Y)] \cdot TF[h_{\psi(\Delta T_i)}(\sigma_X, \sigma_Y)] - 1|^2 = 0$$

as we have seen previously.

The profile(s) of the pupil encoding filter and the associated processes depending on the various thermal increments is/are stored in the first sub-assembly of the image processing unit.

In operational use, the operational temperature range $\Delta T_i$ of the optical objective is known by means of an external sensor. Consequently, the associated defocalization $\psi(\Delta T_i)$ and the appropriate parameters to apply to the objective and to the image process are also known.

Of course, what has been described for variations due to temperature also applies to other external parameters such as ambient pressure, which modifies the optical index of air. It is also possible to apply this optimization mode to a change of focal length, to a focalization going from infinity to a finite distance or to any other parameter liable to influence or modify the quality of the image perceived by the photodetector through the optical objective. And as we have previously seen, it is also possible to index these tables to several zones of field, the whole covering the full format of the image.

The advantages of the optical system according to the invention are many. It is of course possible to use this type of system to preserve an image of very good quality whatever the environmental conditions or the optical parameters. It is also possible to use this technique to simplify the optical combination of the objective and/or remove a lens or a group of lenses or else to reduce the functionality of, or even to remove a lens translation mechanism dedicated to the compensation of thermal drifts.

The invention claimed is:

1. An optical system comprising:
   at least one optical objective, a photosensitive detector and an image processing unit, the optical objective comprising a pupil encoding filter, said pupil encoding filter being fixed relative to the at least one optical objective, the image processing unit configured to perform digital filtering of images output by the photosensitive detector, the processing unit configured to process a plurality of presets, and to implement:
   a first sub-assembly comprising a table of laws relating input presets to processes to be applied to the images by the image processing unit;
   a second sub-assembly controlling various devices for tuning the at least one optical objective; and
   a third sub-assembly performing, multiple times, a digital filtering of images output by the photosensitive detector, each digital filtering being associated to one preset, characteristics of the digital filtering applied to the image depending on an associated preset.

2. The optical system as claimed in claim 1, wherein the pupil encoding filter is dynamic, wherein its phase or amplitude profile is adjustable by means of electrical controls, said phase or amplitude profile being controlled by the preset.

3. The optical system as claimed in claim 1, wherein, the image being composed of a plurality of adjacent zones, the optical system comprises several processing units optimized by image zone, the characteristics of the digital filtering of each processing unit applied to the image being a function of the zone of the image.

4. The optical system as claimed in claim 1, wherein the preset is a value of the temperature or the pressure.

5. The optical system as claimed in claim 1, wherein the preset is the focal distance.

6. The optical system as claimed in claim 1, wherein the preset is an optical parameter of the objective.

7. The optical system as claimed in claim 6, wherein, the objective being a zoom, said parameter is the value of the focal length of the zoom or the value of the aperture of the iris of the zoom.

8. The optical system as claimed in claim 1, wherein the pupil encoding filter comprises a phase correction and/or an amplitude correction, comprising zones with variable optical transmission, the correction distribution being called mask.

9. The optical system as claimed in claim 8, wherein the phase mask has binary distribution, comprising at least two phase zones, each zone having a constant phase different from that of the other zones.

10. The optical system as claimed in claim 8, wherein the phase mask has annular distribution, wherein the value of the phase depends only on its distance to the center of the filter.

11. The optical system as claimed in claim 10, wherein phase variation is composed of constant plateaux, or is a rational power, a function of the distance to the center of the filter, or is logarithmic, a function of the distance to the center of the filter, or is exponential, depending on the distance to the center of the filter.

12. The optical system as claimed in claim 8, wherein the mask has polynomial distribution, the filter being referenced in a coordinate frame (x, y), the phase variation of the correction filter is a polynomial in x and y.

13. The optical system as claimed in claim 8, wherein the mask has cubic distribution, the filter being referenced in a coordinate frame (x, y), the phase correction varies with $\exp[i\alpha(x^3+y^3)]$, i being the square root of $-1$, $\alpha$ being a constant.

14. The optical system as claimed in claim 8, wherein the phase mask is semi-circular.

15. The optical system as claimed in claim 1, wherein the image processing unit operates in real time.

\* \* \* \* \*